United States Patent [19]

Quehen

[11] Patent Number: 4,841,610

[45] Date of Patent: Jun. 27, 1989

[54] DEVICE FOR ADJUSTING THE PROFILE OF A ROLL WITH A DEFORMABLE WALL

[75] Inventor: André Quehen, Pontoise, France

[73] Assignee: Clecim, Courbevoie Cedex, France

[21] Appl. No.: 25,765

[22] Filed: Mar. 13, 1987

[30] Foreign Application Priority Data

Mar. 13, 1986 [FR] France ................. 86 03600

[51] Int. Cl.$^4$ .................. B21B 27/02; B21B 29/00
[52] U.S. Cl. ................. 29/116.2; 29/129.5; 72/243; 72/245; 100/162 B
[58] Field of Search ........... 72/243, 245; 29/113 R, 29/113 AD, 116 R, 116 AD, 129.5; 100/162 B

[56] References Cited

U.S. PATENT DOCUMENTS

| | | | |
|---|---|---|---|
| 4,280,262 | 7/1981 | Ahrweiler | 29/116 AD |
| 4,394,793 | 7/1983 | Pav et al. | 29/116 AD |
| 4,457,057 | 7/1984 | Pav | 29/116 AD |
| 4,581,797 | 4/1986 | Lehmann | 29/116 AD |
| 4,679,287 | 7/1987 | Allard | 29/116 AD |

Primary Examiner—Robert L. Spruill
Assistant Examiner—Steven B. Katz
Attorney, Agent, or Firm—Pollock, Vande Sande & Priddy

[57] ABSTRACT

A device for adjusting the profile of a roll with a deformable wall (1) mounted rotatably about a central shaft (2). Blocks (3) are aligned along the axis between a bearing face (21) of the shaft (2) and the cylindrical inner face (12), and hydraulic thrust jacks (4) are arranged between the face (21) and a bearing face (32) of the blocks (3) at the opposite, for adjusting the radial position of each block (3). The axial and transverse dimensions of each block (3) are different, and its plane and rectangular bearing face (32) works together with a single hydraulic jack (41) having an oblong working cross-section covering the greater part of the face (32). The invention applies especially to rolling-mill cylinders.

3 Claims, 2 Drawing Sheets

DEVICE FOR ADJUSTING THE PROFILE OF A ROLL WITH A DEFORMABLE WALL

FIELD OF THE INVENTION

The invention relates to a device for adjusting the profile of a roll with a deformable wall.

BACKGROUND OF THE INVENTION

At the present time, the technique of rolling is used to produce products in the form of a continuous strip, especially metal sheets.

To ensure accurate adjustment of the profile of a sheet during rolling, it is possible to act on the camber or convexity of the rolls of the roll stand, particularly the back-up rolls which usually surround the two working rolls of smaller diameter. Many devices have been proposed for this purpose but, to ensure accurate adjustment of the profile of the back-up rolls and of the pressure exerted along the contact generatrix, it was thought useful to provide so-called rolls with a deformable wall, which comprise a fixed central shaft in the form of an elongate beam, onto which is slipped a tubular casing mounted on the shaft so as to be rotatable about its axis by means of bearings located at its ends. Between the inner face of the casing and a bearing face provided on the shaft, there are a plurality of retaining blocks which are aligned in series along the shaft and of which the radial position and the pressure exerted on the inner face of the casing can be adjusted by acting on jacks interposed between each block and the fixed shaft.

In general, each block comprises, for this purpose, a rod which forms a piston and which is mounted slidably in a bore of the shaft forming the body of the jack, the rod being equipped, on the same side as the casing, with a cylindrical bearing face of a radius substantially equal to that of the casing.

Because the fixed block bears on the rotating casing, an oil film has to be placed between the bearing faces of the block and of the casing, and usually the block is provided, on its bearing face, with a recess which forms a pocket and which is supplied with oil under pressure and therefore functions as a result of a hydrostatic effect.

The bearing face of the jack usually covers only a limited part of the casing. However, there has already been a proposal to provide blocks covering a relatively large angular sector of the casing, which can extend virtually up to 180°, as indicated, for example, in US-A-No. 3,131,625. If the intention is to arrange a fairly large number of blocks along the contact generatrix, these have a relatively small width which is therefore substantially less than the length of the contact arc, the block thus having a rectangular cross-section. As a result, the block can pivot slightly relative to the bearing point of the thrust jack, and moreover, in U.S. Pat. No. 3,131,625, this bearing point is in the form of a swivel-joint.

However, this pivoting of the block to pivot relative to the jack can have disadvantages, since the block risks becoming askew relative to the casing.

There has also been a proposal, for example in German Offenlegungsschrift No. 2,759,035, to provide blocks covering a relatively long length of the casing, this length being substantially greater than the width of the block.

It can be seen that, in various cases, the retaining blocks can have a rectangular cross-section. If a single jack is used, as in US-A-No. 3,131,625, the width of the working cross-section of the latter cannot exceed the width of the block, and this working cross-section is therefore substantially less than the bearing cross-section of the block on the casing. If the block is to generate a considerable thrust force on the casing, this force being distributed over the rectangular bearing cross-section, the jack must be fed at very high pressure.

To date, such rolls with deformable casings have been used mainly for rolling thin products, such as paper or light metals, and the bearing pressures have not been very high. However, it is now intended to use rolls with deformable casings for rolling sheets, and in this case the bearing pressures on the casing may be much higher. It is therefore expedient to increase the bearing cross-section of the block, making it cover a large annular sector, and at the same time to increase the number of blocks in order to ensure more accurate adjustment. Because of this, each block has a very narrow rectangular cross-section, and, if a single jack is used, it has to be fed at very high pressure, this obviously making the construction of the hydraulic circuits more complicated and more expensive.

It is also possible to associate with each block a larger number of thrust jacks which are distributed over the length of the block and which are fed simultaneously. Such an embodiment was provided, for example, in German Offenlegungsschrift No. 2,759,035, already mentioned, or in GB-No. 2,060,822. This arrangement has the disadvantage of increasing the number of jacks, with their hydraulic circuits, and above all of considerably increasing the length of the seals and consequently the risk of leakage.

SUMMARY OF THE INVENTION

The subject of the invention is new arrangements making it possible to overcome these disadvantages.

The invention also embraces a particular embodiment of the blocks and of the thrust jacks, having considerable advantages, especially when the block has a rectangular bearing face.

According to the invention, the dimensions of each block in the axial longitudinal direction and in the transverse direction differ substantially from one another, and each block has, on the same side as the fixed shaft, a rectangular plane bearing face, on which bears a single hydraulic jack forming a single thrust means to the block, the said jack having an oblong working cross-section which can alone cover the greater part of the rectangular bearing face of the block.

In a preferred embodiment, the piston of the jack bears on the shaft and slides in a recess of oblong cross-section formed in the plane bearing face and in the thickness of the block, the latter itself constituting the body of the jack.

In an especially advantageous embodiment, each block, as seen in cross-section in a plane transverse to the axis, has the form of a crescent limited on one side by the circular face and on the other by a plane face, in which is formed a recess, the bottom of which constitutes the bearing face of the jack and the side walls of which slide along guide faces made on the central shaft perpendicularly to the bearing face of the latter.

In an especially advantageous way, the piston of each thrust jack is composed of a separate plate engaging into the recess formed in the body of the block and bearing on the shaft by means of a smooth face capable of sliding on the plane bearing face of the shaft, the said plate being limited laterally by a lateral face mounted so as to slide along the lateral face of the recess, a gasket being inserted between the said lateral faces of the recess and of the plate.

Preferably, the oblong working cross-section of the jack is limited by two longitudinal sides which are parallel to the long sides of the rectangular bearing face of the block and which are connected at their ends by means of two circular cylindrical sides, so as to form a joining line without any angular point.

BRIEF DESCRIPTION OF THE DRAWINGS

The invention will be better understood from the following description of a particular embodiment given by way of example and illustrated in the accompanying drawings.

DESCRIPTION OF PREFERRED EMBODIMENT

Figure 1:
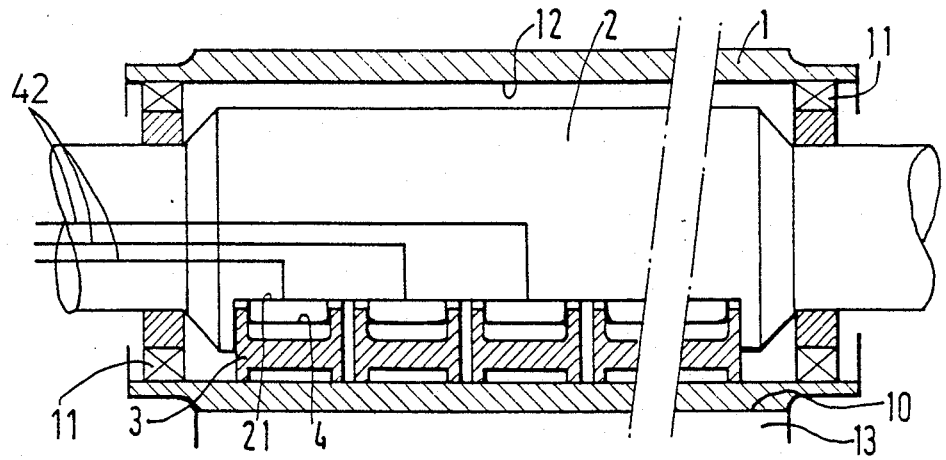
FIG. 1 is a diagrammatic view, in longitudinal section, of a roll with a deformable casing according to the invention.

FIG. 1 shows diagrammatically a roll with a deformable casing, comprising a tubular casing 1 mounted rotatably, by means of bearings 11, on a fixed support 2 in the form of an elongate beam slipped inside the tubular casing 1.

The roll 1 is, for example, a back-up roll of a rolling mill and therefore bears on a working roll 13 along a contact generatrix 10.

On the same side as the roll 13, the central shaft 2 is equipped with a plane face 21, along which is arranged a series of retaining blocks 3 which are inserted between the bearing face 21 of the shaft and the inner face 12 of the casing.

Associated with each retaining block 3 is a thrust jack 4 which is fed by a hydraulic circuit and which makes it possible to adjust the radial position of the block and the thrust pressure exerted on the casing 1.

Figure 2:
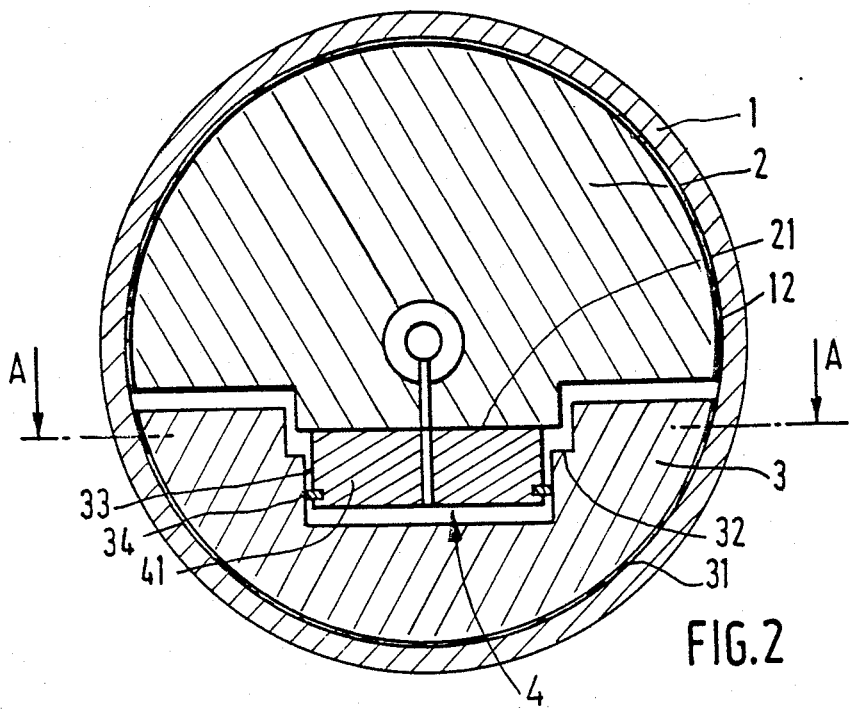
FIG. 2 is a diagrammatic view, in cross-section, of a first embodiment of the block.
Figure 3:
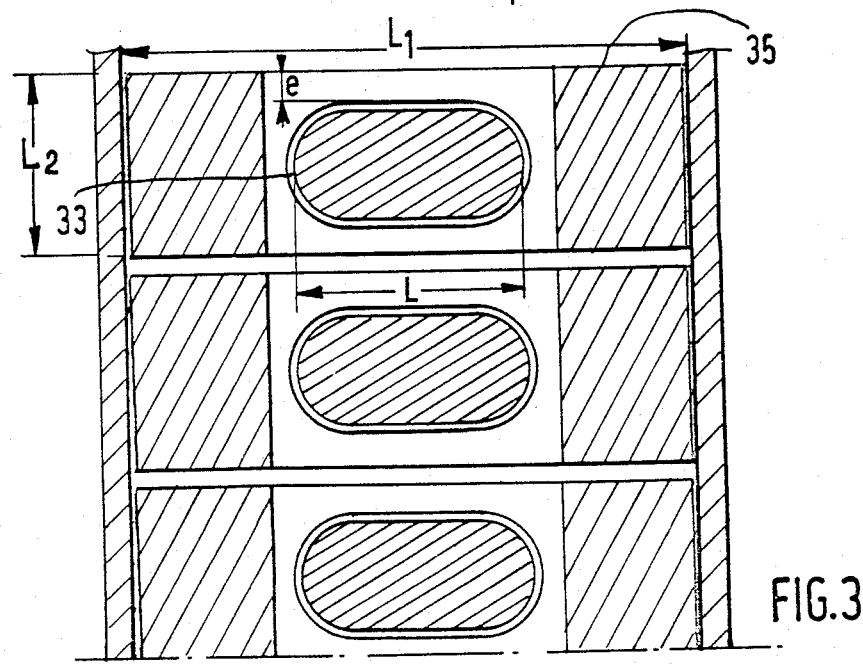
FIG. 3 is a plan view in a section along the line A—A of FIG. 2.

FIG. 2 illustrates a particularly simple embodiment of the block 3 and of its thrust jack.

According to an advantageous characteristic of the invention, each retaining block has the form of a crescent limited, on the same side as the casing 1, by a cylindrical face 31 of a radius substantially equal to that of the inner face 12 of the casing and, on the opposite side, by a plane face 32 parallel to and confronting the bearing face 21 of the shaft 2.

In the embodiment illustrated, the jack 4 comprises a rod 41 which penetrates into a recess 33 formed in the central part of the block and in the thickness of the latter.

According to the invention, the recess 33 has an oblong cross-section which extends over a length L as large as possible in relation to the total length L1 of the block. In general, the dimensions of the oblong cross-section of the recess 33 are determined so that a thickness of metal sufficient to withstand the operating pressure is left at the sides.

The piston 41 has an oblong cross-section corresponding to that of the receptacle 33 with the necessary play, a gasket 34 being inserted between the side walls of the piston and of the recess.

As shown in the drawings, the working cross-section of the piston and of the recess is therefore preferably limited by two longitudinal sides parallel to the lateral faces 35 of the block limiting the long sides of the rectangular bearing face, and two circular cylindrical sides connected tangentially to the longitudinal sides, so as to form a joining line without an angular point.

The invention ensures the best possible force application surface for a given overall size, i.e., for the available surface of the bearing face. This reduces the number and the length of the seals, and consequently the risk of leakage. Machining becomes much simpler, and this lowers the cost of the device. Increasing the force application surface to the maximum extent in this way consequently increases the transmissible force for a given operating pressure, or a reduced pressure is used in order to obtain the same force for adjusting the blocks.

Figure 4:
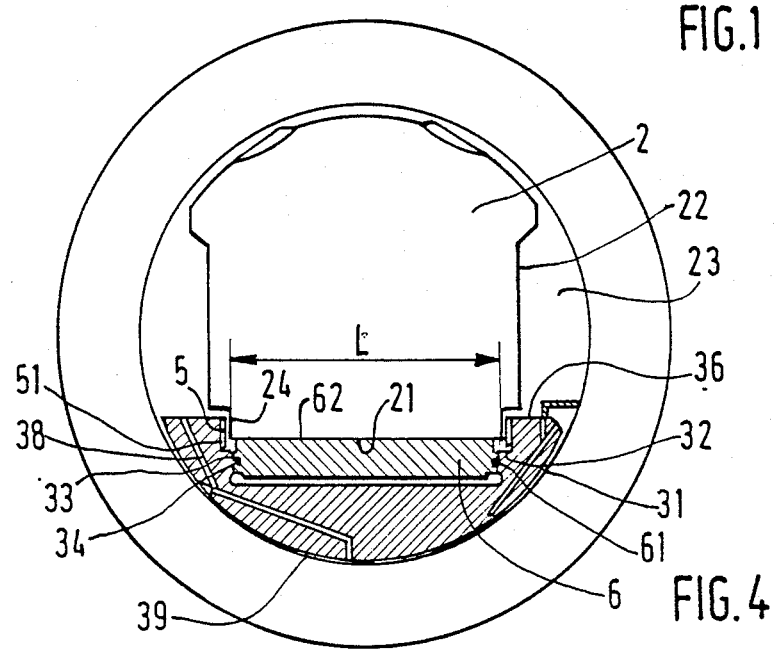
FIG. 4 and FIG. 5 are cross-sectional views in two different planes of a further-improved embodiment of the block.
Figure 5:
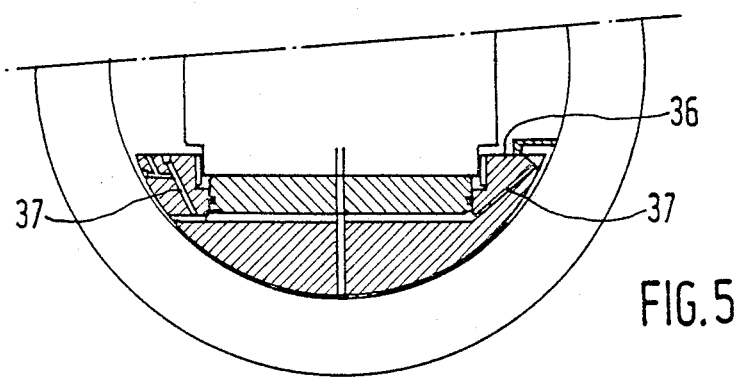

FIGS. 4 and 5 illustrate a further-improved embodiment of the block.

As already seen, the length L of the oblong working cross-section depends on the depth of the recess 33 which itself is determined by the travel of the block and the need to ensure that the latter is guided. As a result, platforms 36 are arranged at the two ends of the block, and these can advantageously be used to place oil-feed devices there. This avoids the need for a central feed, of the type shown in FIG. 2. In fact, the beam 2 can be limited by lateral faces 22 which leave free above the platforms 36 a space 23, in which the various devices for feeding and discharging the hydraulic fluid can be placed. The corresponding circuits are not shown, since they can be of any conventional type, and they terminate in bores 37 in the sides of the block and ending in the bottom of the recess 33, as shown in FIG. 5, Likewise, other bores 38 fed in another way can be made inside the block 3, in order to feed hydrostatic pockets 39 formed on the bearing face 31 of the block.

It is especially advantageous, as shown in FIGS. 4 and 5, to separate the guide function and the function of sealing the jack. In fact, each block 3 is equipped with a recess 5 which can cover the entire width of the block and the bottom of which forms the bearing face 32, in which the receptacle 33 for the jack is made. The recess 5 is limited by two lateral faces 51 which are parallel to the axis of the roll and which slide along corresponding guide faces 24 of the shaft 2. However, a slight play is provided between the guide faces, to avoid impeding the sliding of the block under the action of the jack and allow it to adjust itself freely, especially when the oil film between the block and the casing is produced as a result of a hydrodynamic effect.

It is expedient, in fact, to allow the block to shift slightly relative to the shaft 2, and for this purpose the piston of the jack is composed of a plate 6 which has an oblong cross-section corresponding to that of the recess 33 and which engages inside the latter. The plate 6 is therefore limited by a side wall 61 which slides along the side wall of the recess 33, with a gasket 34 interposed. However, the plate 6 is not fixed to the beam 2 and simply bears on the latter by means of a smooth face 62 which can slide slightly along the bearing face 21 of the shaft 2.

In this way, the block can undergo slight shifts limited merely by the amount of play left between the guide faces 24 and 51, sealing still being ensured by the gasket 34.

The invention is thus particularly suitable for producing blocks utilizing a hydrodynamic effect, such as those described in the applicant's French Pat. No. FR 2,572,313. In particular, it makes it possible for the block to cover a large angular sector, the extent of which is determined by a study of the behavior of the oil film interposed between the block and the casing as a result of a hydrodynamic effect.

What I claimed is:

1. Roll with a deformable wall especially for rolling metal sheets, comprising
    (a) a central shaft in the form of an elongate beam having a bearing face, and guide faces perpendicular to said bearing face;
    (b) a tubular casing mounted for rotation about its axis on said shaft and having a cylindrical circular inner face;
    (c) a plurality of retaining blocks aligned in a series along said axis between said bearing face of the shaft and said cylindrical inner face of the casing, each retaining block having the form of a crescent delimited on one side by a circular bearing face confronting the inner face of the casing along a contact arc and on the other side by a rectangular plane face confronting said bearing face of the shaft and in which is formed a recess having side walls adapted to slide along said guide faces of said shaft, a slight play being provided between said side walls and said guide faces to permit said block to adjust itself freely;
    (d) said contact arc covering a relatively large angular sector of said casing and the number of said blocks being so large that each block has a width which is substantially less than the length of said contact arc;
    (e) each of said retaining blocks being associated with a single hydraulic jack arranged between said bearing face of the shaft and said plane face of the retaining block for individual adjustment of the radial position of the latter, said single hydraulic jack comprising a body delimiting a receptacle in which can slide a piston, said receptacle and said piston having an oblong cross section;
    (f) said body of each single jack being constituted by the retaining block itself, said receptacle being formed in the thickness of said retaining block;
    (g) said piston of each single jack being composed of a separate plate engaging into said receptacle and bearing on said shaft by means of a smooth face capable of sliding on said plane bearing face of said shaft, said plate being delimited laterally by a lateral face mounted for sliding movement along said lateral face of said receptacle, a gasket being inserted between said lateral faces of said receptacle and of said plate.

2. The device as claimed in claim 1, wherein the oblong working cross-section of the jack is delimited by two longitudinal sides parallel to the long sides of the rectangular bearing face of the block and connected at their ends by means of two circular cylindrical sides, so as to form a joining line without an angular point.

3. Roll with deformable wall as claimed in claim 1, wherein two platforms are arranged respectively at each end of said plane face of each block for placing oil feed devices, said shaft being provided with lateral faces leaving free above said platforms spaces in which hydraulic devices can be placed.

* * * * *